United States Patent
Almasan et al.

(10) Patent No.: US 10,120,888 B2
(45) Date of Patent: Nov. 6, 2018

(54) AUTOMATED TASK EXECUTION BASED ON TASK CRITERIA

(71) Applicant: AMERICAN EXPRESS TRAVEL RELATED SERVICES COMPANY, INC., New York, NY (US)

(72) Inventors: Rares Ioan Almasan, Phoenix, AZ (US); Rebecca Henry, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 113 days.

(21) Appl. No.: 15/231,558

(22) Filed: Aug. 8, 2016

(65) Prior Publication Data

US 2018/0039512 A1 Feb. 8, 2018

(51) Int. Cl.
*G06F 9/46* (2006.01)
*G06F 17/30* (2006.01)
*G06F 9/48* (2006.01)

(52) U.S. Cl.
CPC ...... *G06F 17/30312* (2013.01); *G06F 9/4843* (2013.01)

(58) Field of Classification Search
None
See application file for complete search history.

(56) References Cited

U.S. PATENT DOCUMENTS

| | | | | |
|---|---|---|---|---|
| 2007/0168874 | A1* | 7/2007 | Kloeffer | G06F 8/65 715/764 |
| 2007/0288290 | A1* | 12/2007 | Motoyama | G06Q 10/06 705/7.13 |
| 2008/0066072 | A1* | 3/2008 | Yurekli | G06Q 10/06 718/104 |
| 2009/0319687 | A1* | 12/2009 | Goldstein | G06F 9/5083 709/241 |

* cited by examiner

*Primary Examiner* — Wissam Rashid
(74) *Attorney, Agent, or Firm* — Snell & Wilmer L.L.P.

(57) ABSTRACT

A system and method for automated continuous task triggering is provided. The system may provide automated continuous task triggering by monitoring a data source and a data output, retrieving a task criteria from a criteria database, and executing a task in response to the task criteria being met. The task criteria may comprise a set of instructions to execute the task on the data source and the data output. The system may also recalibrate the task criteria based on the executing of the task to generate a recalibrated task criteria.

17 Claims, 5 Drawing Sheets

AUTOMATED TASK EXECUTION BASED ON TASK CRITERIA

FIELD

The disclosure generally relates to computer tasks, and more specifically, to systems and methods for automated continuous task triggering.

BACKGROUND

Business processes may rely on computer tasks to aide in data processing, statistics, analytics, and/or the like. Tasks may be configured to run on a variety of data sources across multiple platforms. Typically, tools exist to assist in running various tasks. These tools may be dependent on static and defined task criteria such as system resource availability and utilization, time constraints, and/or the like. For example, a tool may be set to run a task at 5:00 p.m. every day, run every 10 minutes, run after a preceding task completes, run after 5 dependent tasks complete, run after a central processing unit (CPU) commit reaches 50%, and/or the like. In that regard, the tasks may run regardless of a need and/or requirement to run. The static and defined nature of the task criteria may cause inefficient resource utilization (e.g., with CPU, RAM, storage, and/or the like) and monetary waste due to tasks running more frequently than desired and/or needed. As such, there is an increased need for tools to provide an automated continuous task triggering based on predictive and dynamic dependencies.

SUMMARY

In various embodiments, systems, methods, and articles of manufacture (collectively, the "system") for automated continuous task triggering are disclosed. The system may comprise monitoring a data source and a data output. The system may comprise retrieving a task criteria from a criteria database. The task criteria may comprise instructions to execute a task on the data source and the data output. The system may comprise executing the task in response to the task criteria being met. The system may comprise recalibrating the task criteria based on the executing of the task to generate a recalibrated task criteria.

In various embodiments, the system may further comprise transmitting the recalibrated task criteria to the criteria database. The recalibrated task criteria may be stored as an updated version of the task criteria in the criteria database. The recalibrating the task criteria may be based on a recalibration event, and wherein the recalibration event comprises at least one of a data output spike, a rise in data volume, a change in data execution order, an increase in execution errors, a change in output of the data output, or a change in input of the data output. The task criteria may comprise at least one of a time interval, a data threshold, or a data value.

In various embodiments, the system may further comprise generating a task report based on the recalibrating the task criteria. The system may also comprise transmitting the task report to a user terminal.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
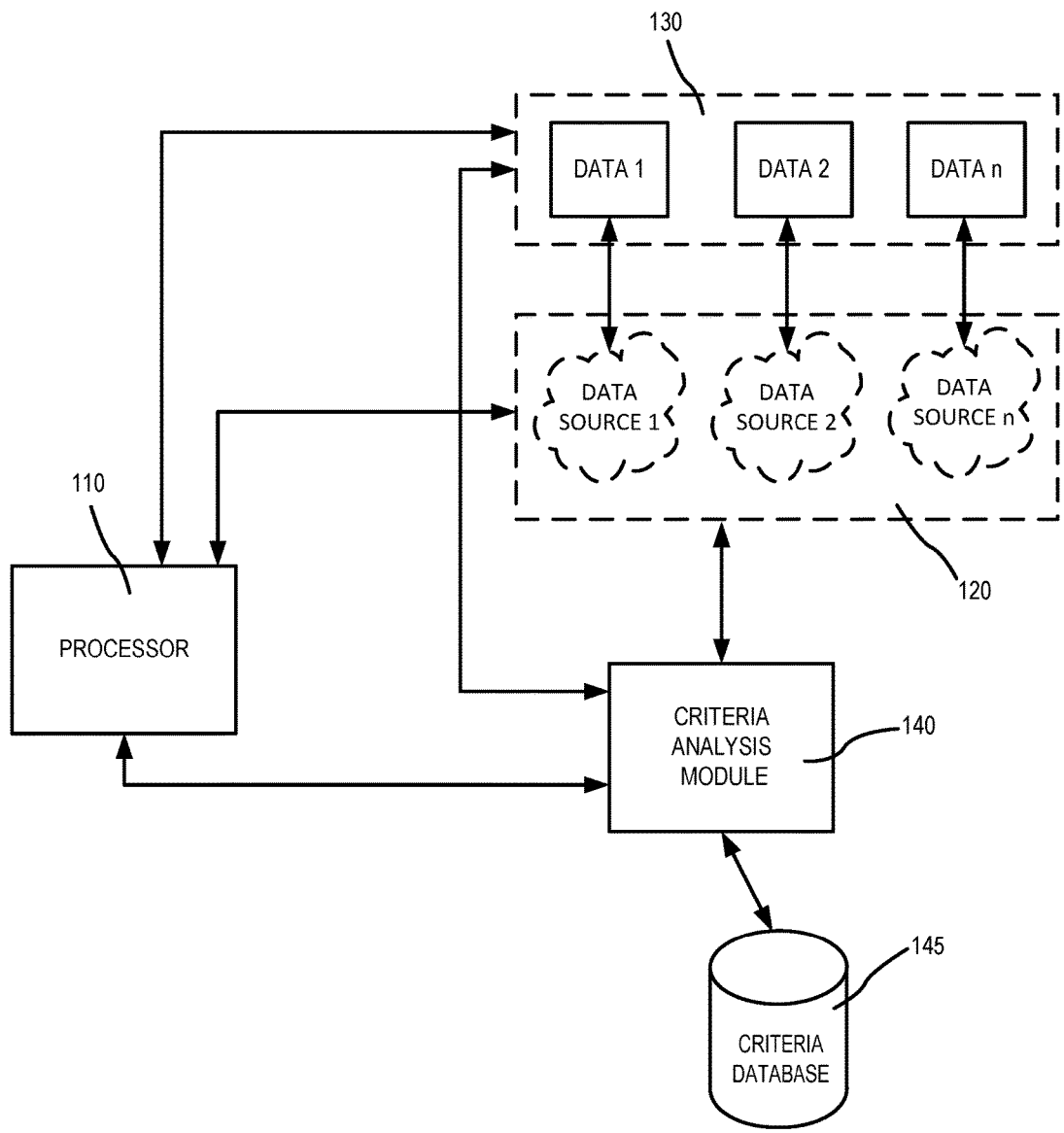
FIG. 1 is a block diagram illustrating various system components of a system for automated continuous task triggering, in accordance with various embodiments.

In various embodiments, and with reference to FIG. 1, a system 100 for automated continuous task triggering is provided. A task may comprise processing computer data in system 100, such as, for example, during the creation and/or sending of data, formatting of data, statistical and/or analytical analysis of data, and/or the like. In that regard, the task may comprise any suitable processing of computer data in system 100. System 100 may enhance task triggering efficiency by configuring and automating tasks to run only as desired, as needed and/or as required, thereby reducing resource-related waste. In that regard, system 100 may decrease system inefficiencies such as, for example, the unnecessary operation of system components and hardware including processors, databases, memory, and/or the like. Moreover, system 100 may result in reductions to monetary costs associated with the unnecessary operation of system components and hardware, including, for example, CPU costs, storage costs, memory costs, and/or the like. System 100 may increase the reliability and accuracy of task reporting, task alerting, and/or the like by improving the accuracy of data impacted by the output of tasks.

In various embodiments, system 100 may comprise a processor 110, a data source 120, data 130, a criteria analysis module 140, and a criteria database 145. System 100 may also be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, processor 110 may be configured as a central hub to access various engines, databases, and infrastructure of system 100. Processor 110 may be configured to receive, parse, analyze, and transmit data. Processor 110 may comprise any suitable type of processor and/or system capable of receiving, parsing, analyzing, and transmitting data. Processor 110 may be in electronic and/or operative communication with data source 120, data 130, and/or criteria analysis module 140. Processor 110 may be in electronic and/or operative communication using any suitable method discussed in this disclosure or known in the art.

In various embodiments, data source 120 may comprise any source of data existing in system 100, and/or any other suitable system environment. In that regard, data source 120 may comprise a source of data relating to a business process. For example, data source 120 may comprise objects generated for business needs, such as, tables merging data from various structured, semi-structured, and/or unstructured sources; merged files; merged databases; customized alerts, dashboards, and/or reports; dynamic monitoring based on intertwined data from multiple environments; data transmission and/or migration; and/or the like. In various embodiments, data source 120 may also comprise sources of data related to financial and/or transactional systems and processes, such as, for example, a merchant submission system, a settlement database, an accounts receivable database, and/or the like. In various embodiments, data source 120 may be selected by processor 110. In that regard, processor 110 may identify and automatically select data source 120 that is related to the business process. Data source 120 may be in electronic and/or operative communication with processor 110, data 130, and/or criteria analysis module 140. Data source 120 may be in electronic and/or operative communication using any suitable method discussed in this disclosure or known in the art.

In various embodiments, data 130 may comprise data output from data source 120, and/or data received and/or output from any other system 100 platform or module. Data 130 may comprise any suitable type of data in system 100, such as system data, historical data, and/or the like. In that regard, data 130 may comprise a subset of data output by data source 120. For example, wherein data source 120 comprises a database, data 130 may comprise data residing in the database, data regarding the database (e.g., the type of database, characteristics of the database, metadata of the database, etc.), historical data regarding the database, and/or the like. Data 130 may comprise formatted data, raw data, and/or data in any other suitable and/or desired form. Data 130 may be in electronic and/or operative communication with processor 110, data source 120, and/or criteria analysis module 140. Data 130 may be in electronic and/or operative communication using any suitable method discussed in this disclosure or known in the art.

In various embodiments, criteria analysis module 140 may be configured to monitor data source 120 and data 130 and execute the task on data source 120 and data 130 in response to a task criteria being met. Criteria analysis module 140 may also be configured to monitor data source 120 and data 130, and monitor the executing of tasks to recalibrate the task criteria. In various embodiments, criteria analysis module 140 may comprise a module of processor 110. Criteria analysis module 140 may also comprise a separate engine and/or module in system 100. Criteria analysis module 140 may be in electronic and/or operative communication with processor 110, data source 120, data 130, and/or criteria database 145. Criteria analysis module 140 may be in electronic and/or operative communication using any suitable method discussed in this disclosure or known in the art. In various embodiments, criteria database 145 may be configured to store and maintain the task criteria. Criteria database 145 may store the task criteria using any suitable method disclosed herein or known in the art. Criteria database 145 may be in electronic and/or operative communication with criteria analysis module 140, using any suitable method discussed in this disclosure or known in the art.

Figure 2:
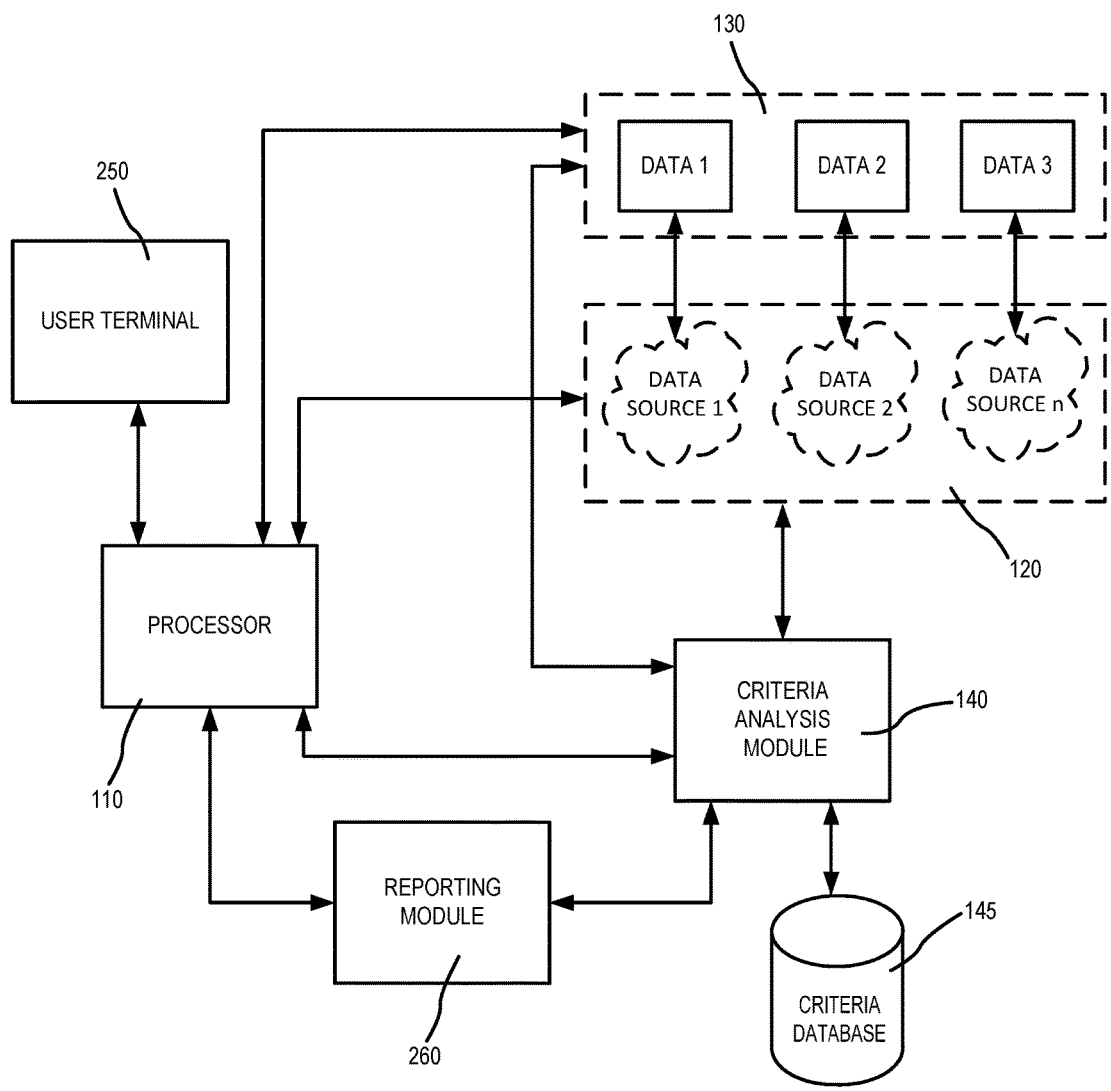
FIG. 2 is a block diagram illustrating various system components of a system for automated continuous task triggering further comprising input and reporting capabilities, in accordance with various embodiments.

In various embodiments, and with reference to FIG. 2, a system 200 for automated continuous task triggering may also comprise a user terminal 250 and a reporting module 260. System 200 may enable a user to interact with criteria analysis module 140. In that regard, the user may review, recalibrate, and/or revise task criteria for system 200. System 200 may also enable reporting back to the user, via user terminal 250.

In various embodiments, user terminal 250 may comprise hardware and/or software capable of allowing a user access to system 100. For example, user terminal 250 may comprise any suitable device allowing a user to communicate with a network, such as a personal computer, personal digital assistant, cellular phone, kiosk, and/or the like. User terminal 250 may allow the user to communicate with criteria analysis module 140, via processor 110, to review, recalibrate, and/or revise task criteria, and/or any other suitable input, for system 100 to match to a stored name. User terminal 250 may be in electronic and/or operative communication with processor 110 using any suitable method discussed in this disclosure or known in the art.

In various embodiments, reporting module 260 may be configured to generate a task report. In that respect, reporting module 260 may communicate with criteria analysis module 140 and processor 110 to receive data regarding the tasks executed in system 200. Reporting module 260 may also be configured to provide reporting capabilities by transmitting the task report to user terminal 250, via processor 110. In that regard, the task report may be transmitted via email, text message, file transfer, and/or the like. Reporting module 260 may be in may be in electronic and/or operative communication with processor 110 and/or criteria analysis module 140, using any suitable method discussed in this disclosure or known in the art.

Figure 3:
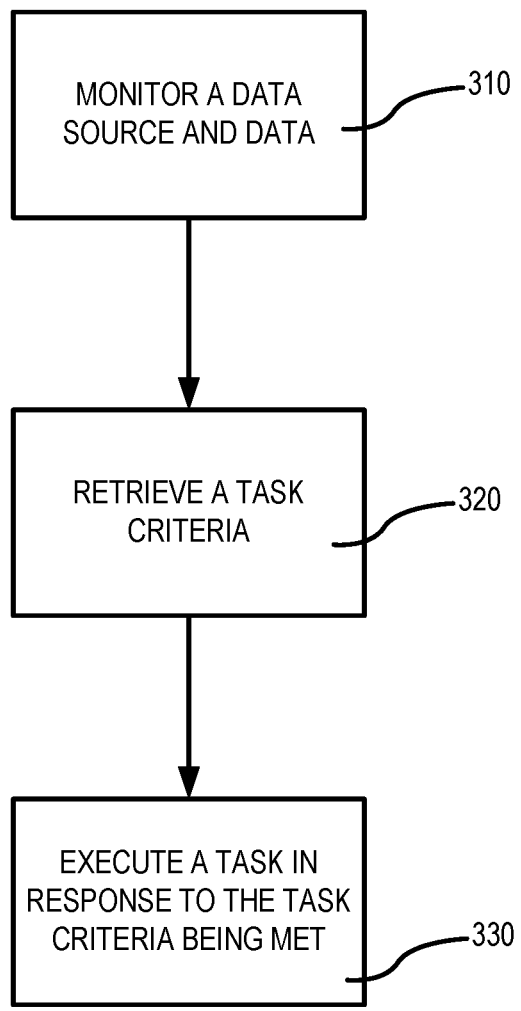
FIG. 3 illustrates a process flow for automated continuous task triggering, in accordance with various embodiments.

In various embodiments, and with reference to FIG. 3, a method 300 for automated continuous task triggering is disclosed. In various embodiments, method 300 may comprise monitoring data source 120 and data 130 (Step 310). In that regard, processor 110 may instruct criteria analysis module 140 to monitor data source 120 and data 130. Criteria analysis module 140 may monitor data source 120 and data 130 in real time, semi-real time, and/or at any other desired interval. In various embodiments, criteria analysis module 140, and/or processor 110, may also continuously monitor system 100, including data source 120 and data 130.

In various embodiments, method 300 may comprise retrieving a task criteria (Step 320). Criteria analysis module 140 may retrieve the task criteria from criteria database 145. The task criteria may comprise a set of defined rules relating to the triggering and/or execution of tasks. For example, the task criteria may comprise a time interval (e.g., the task will execute at 7:00 A.M., every 3 hours, and/or the like), a data threshold (e.g., the task will execute in response to data 130 increasing 20%), a data value (e.g., the task will execute in response to data source 120 comprising one hundred data 130, or in response to data 130 existing), and/or any other suitable task criteria. In various embodiments, the task criteria may be stored in criteria database 145 with metadata, tags, pointers, and/or the like indicating the corresponding data source 120 and/or data 130. In various embodiments, the task criteria may also be stored as a script in a schemaless architecture. Criteria analysis module 140 may retrieve the task criteria relating to each individual data source 120 and/or data 130. In that regard, criteria analysis module 140 may continuously, or intermittently, retrieve the task criteria from criteria database 145 while also monitoring data source 120 and data 130. Criteria analysis module 140 may retrieve the task criteria continuously to ensure that the most updated task criteria is being used (e.g., to account for recalibrated task criteria).

In various embodiments, method 300 may comprise executing the task in response to the task criteria being met (Step 330). Criteria analysis module 140 may execute the task on data source 120 and/or data 130 in response to the task criteria relating to each data source 120 and/or data 130 being met. Criteria analysis module 140 may also communicate with processor 110 to execute the task on data source 120 and/or data 130. The task may be executed to process data 130 in system 100, such as, for example, statistical and/or analytical processing. In that regard, execution of the task may cause processor 110 to retrieve data 130 and process data 130 as desired.

Figure 4:
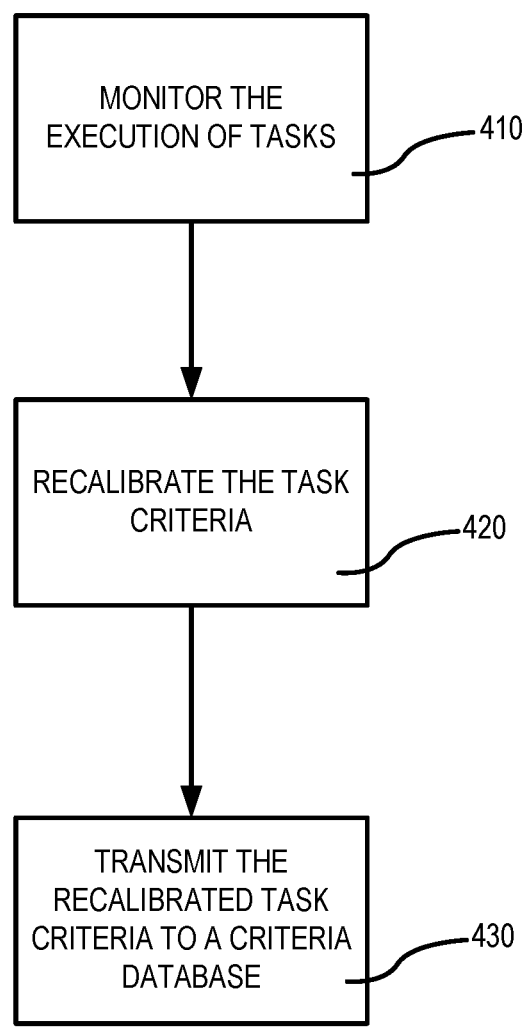
FIG. 4 illustrates a process flow for recalibrating task criteria, in accordance with various embodiments.

In various embodiments, and with reference to FIG. 4, a method 400 for recalibrating task criteria is disclosed. Method 400 may enable the recalibration of the task criteria based on machine learning and predictive analysis. In that regard, machine learning and predictive analysis may enable method 400 to recalibrate the task criteria to ensure that tasks are being executed correctly and accurately. In various embodiments, method 400 may comprise monitoring the execution of tasks on data source 120 and data 130 (Step 410). In that regard, criteria analysis module 140, and/or processor 110, may continuously monitor data source 120 and data 130 while tasks are executed in response to the task criteria being met. Continuous monitoring of data source 120 and data 130 may enable criteria analysis module 140 to recalibrate the task criteria as the changes are occurring in system 100 that may require recalibration of the task criteria In various embodiments, method 400 may comprise recalibrating the task criteria (Step 420). Step 410 may enable method 400 to monitor the system to allow recalibration of the task criteria (in Step 420) to accurately reflect the present state of the system. In that regard, the task criteria may be dynamically recalibrated based on the machine learning and predictive analysis taking place, while monitoring the execution of tasks on data source 120 and data 130 in step 410. Machine learning and predictive analysis may impact the recalibration of the task criteria by enabling criteria analysis module 140 to "update", and/or recalibrate, the task criteria to take into account the current state of the system. The task criteria may be recalibrated by criteria analysis module 140, and/or processor 110. Criteria analysis module 140 may analyze the execution of the tasks to determine whether a recalibration event has occurred. For example, the recalibration event may comprise any event in system 100, such as during the execution of the task, that may require a recalibration of the task criteria. The recalibration event may therefore cause a need to recalibrate the task criteria, as changes in system 100 cause the task criteria to no longer be accurate.

In that regard, and in various embodiments, the recalibration event may comprise a data output spike (e.g., data source 120 has a spike in outputting data 130 at a certain time every day, week, and/or month), a rise in data volume (e.g., data 130 usually increases daily by 5%, but suddenly increases by 30%), a change in data execution order (e.g., the task for data source 120-1 is usually executed prior to the task for data source 120-2, but due to a change in output, and/or a system event, data source 120-2 should be executed prior to the task for data source 120-1), an increase in execution errors (e.g., data source 120 comprises an increase in the number of reported errors during the execution of the task), a change in output and/or input time (e.g., a sudden increase in the output of data 130 by data source 120, and/or data source 120 changes from outputting data at 2:00 on Monday to 5:00 on Tuesday), and/or any other suitable recalibration event. Criteria analysis module 140 may recalibrate the task criteria by updating the task criteria to take into account the recalibration event, and generate a recalibrated task criteria. For example, in response to a task criteria comprising a time of execution of 5:00 P.M., and criteria analysis module 140 receiving a recalibration event indicating that a data input is now being received at 5:30 P.M. instead of a prior time, criteria analysis module 140 may recalibrate the task criteria to comprise a time of execution of 5:45 P.M., 6:00 P.M., and/or any other suitable time after 5:30 P.M.

In various embodiments, method 400 may comprise transmitting the recalibrated task criteria to criteria database 145 (Step 430). Criteria analysis module 140, and/or processor 110, may transmit the recalibrated task criteria to criteria database 145. The recalibrated task criteria may be stored in criteria database 145 to link to the related data source 120 and/or data 130. The recalibrated task criteria may comprise metadata, and/or the like, linking it to the specific data source 120 and/or data 130 related to the task. In various embodiments, criteria database 145 may store the recalibrated task criteria as an updated version of the task criteria, wherein the original task criteria is not removed from criteria database 145.

Figure 5:
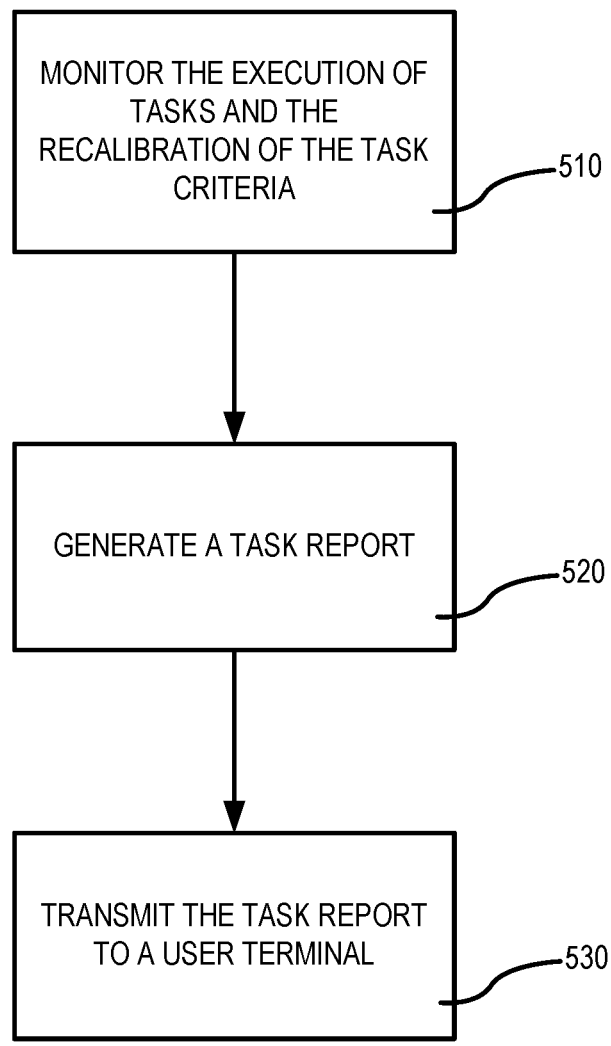
FIG. 5 illustrates a method for enhanced reporting of automated continuous task triggering, in accordance with various embodiments.

In various embodiments, and with reference to FIG. 5, a method 500 for enhanced reporting of automated continuous task triggering is disclosed. In various embodiments, method 500 may comprise monitoring the execution of the tasks and the recalibration of the task criteria (Step 510). In that regard, reporting module 260 may be configured to monitor the execution of the tasks on data source 120 and/or data 130, via processor 110, and the recalibration of the task criteria by criteria analysis module 140.

In various embodiments, method 500 may comprise generating a task report (Step 520). Reporting module 260 may generate the task report. The task report may comprise data relating to the automated continuous task triggering in system 200. For example, the task report may comprise data on the tasks, such as the frequency each task is executed, the timing of the execution of the task, data regarding recalibration of the task criteria, and/or the like. The task report may be generated as an email, a text document, an SMS or MMS text message, and/or any other suitable format. In various embodiments, method 500 may comprise transmitting the task report to a user terminal 250 (Step 530). In that regard, reporting module 260 may transmit the task report, via processor 110, to user terminal 250. The task report may be transmitted via email, text message, file transfer, and/or the like.

In various embodiments, the system and method may include alerting a subscriber when their computer is offline. With brief reference to FIG. 2, system 200 may include generating customized information and alerting a remote subscriber that the information can be accessed from their computer (e.g., user terminal 250). The alerts are generated by filtering received information, building information alerts and formatting the alerts into data blocks based upon subscriber preference information, via reporting module 260, for example. The data blocks are transmitted to the subscriber's wireless device, via processor 110 for example, which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source (e.g., data source 120) over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen (e.g., via user terminal 250); displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor (e.g., processor 110), to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer (e.g., user terminal 250) from being compromised, for example by being infected with a computer virus. The system may scan, via processor 110 for example, electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Phrases and terms similar to an "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A record of charge (or "ROC") may comprise any transaction or transaction data. The ROC may be a unique identifier associated with a transaction. A transaction may, in various embodiments, be performed by a one or more members using a transaction account, such as a transaction account associated with a gift card, a debit card, a credit card, and the like. A ROC may, in addition, contain details such as location, merchant name or identifier, transaction amount, transaction date, account number, account security pin or code, account expiry date, and the like for the transaction.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the herein particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system may also include a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and communicates a detected input from the hardware to the micro-app.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "transmit" may include sending electronic data from one system component to another over a network connection. Additionally, as used herein, "data" may include encompassing information such as commands, queries, files, data for storage, and the like in digital or any other form.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, or object-oriented structure and/or any other database configurations. The databases may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may then be designated as a key field in a plurality of related data tables and the data tables may be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

As used herein, the term "end user", "consumer", "customer", "cardmember", "business", "merchant", or "financial institution" may be used interchangeably with each other, and each shall mean any person, entity, government organization, business, machine, hardware, and/or software.

A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other transaction networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element herein is intended to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   monitoring, by a processor of a computer based system, a data source and a data output from the data source;
   retrieving, by the processor, a task criteria from a criteria database, wherein the task criteria comprises instructions to execute a task on at least one of the data source or the data output, wherein the task criteria comprises at least one of a time interval, a data threshold, or a data value;
   executing, by the processor, the task on at least one of the data source or the data output in response to satisfying the task criteria;
   monitoring, by the processor, the executing of the task on at least one of the data source or the data output; and
   recalibrating, by the processor, the task criteria based on the monitoring the executing of the task to generate a recalibrated task criteria.

2. The method of claim 1, further comprising transmitting, by the processor, the recalibrated task criteria to the criteria database.

3. The method of claim 2, wherein the recalibrated task criteria is stored as an updated version of the task criteria in the criteria database.

4. The method of claim 1, wherein the recalibrating of the task criteria is based on a recalibration event comprising at least one of a data output spike, a rise in data volume, a change in data execution order, an increase in execution errors, a change in output of the data output, or a change in input of a data input into the data source.

5. The method of claim 1, further comprising generating, by the processor, a task report based on the recalibrating of the task criteria.

6. The method of claim 5, further comprising transmitting, by the processor, the task report to a user terminal.

7. A system comprising:
   a processor,
   a tangible, non-transitory memory configured to communicate with the processor, the tangible, non-transitory memory having instructions stored thereon that, in response to execution by the processor, cause the processor to perform operations comprising:
   monitoring, by the processor, a data source and a data output from the data source;
   retrieving, by the processor, a task criteria from a criteria database, wherein the task criteria comprises instructions to execute a task on at least one of the data source or the data output, and wherein the task criteria comprises at least one of a time interval, a data threshold, or a data value;
   executing, by the processor, the task on at least one of the data source or the data output in response to satisfying the task criteria;
   monitoring, by the processor, the executing of the task on at least one of the data source or the data output; and
   recalibrating, by the processor, the task criteria based on the monitoring the executing of the task to generate a recalibrated task criteria.

8. The system of claim 7, further comprising transmitting, by the processor, the recalibrated task criteria to the criteria database.

9. The system of claim 8, wherein the recalibrated task criteria is stored as an updated version of the task criteria in the criteria database.

10. The system of claim 7, wherein the recalibrating the task criteria is based on a recalibration event comprising at least one of a data output spike, a rise in data volume, a change in data execution order, an increase in execution errors, a change in output of the data output, or a change in input of a data input into the data source.

11. The system of claim 7, further comprising generating, by the processor, a task report based on the recalibrating the task criteria.

12. The system of claim 11, further comprising transmitting, by the processor, the task report to a user terminal.

13. An article of manufacture including a non-transitory, tangible computer readable storage medium having instructions stored thereon that, in response to execution by a computer based system, cause the computer based system to perform operations comprising:
   monitoring a data source and a data output from the data source;
   retrieving a task criteria from a criteria database, wherein the task criteria comprises instructions to execute a task on at least one of the data source or the data output, wherein the task criteria comprises at least one of a time interval, a data threshold, or a data value;
   executing the task on at least one of the data source or the data output in response to satisfying the task criteria;
   monitoring, by the processor, the executing of the task on at least one of the data source or the data output; and
   recalibrating the task criteria based on the monitoring the executing of the task to generate a recalibrated task criteria.

14. The article of manufacture of claim 13, further comprising transmitting the recalibrated task criteria to the criteria database.

15. The article of manufacture of claim 14, wherein the recalibrated task criteria is stored as an updated version of the task criteria in the criteria database.

16. The article of manufacture of claim 13, wherein the recalibrating the task criteria is based on a recalibration event comprising at least one of a data output spike, a rise in data volume, a change in data execution order, an increase in execution errors, a change in output of the data output, or a change in input of a data input into the data source.

17. The article of manufacture of claim 13, further comprising generating a task report based on the recalibrating the task criteria, and transmitting the task report to a user terminal.

* * * * *